Jan. 25, 1955  O. F. FOIN, JR  2,700,763
ANGLE DETECTOR CIRCUITS FOR RADAR USE
Filed Aug. 19, 1949  3 Sheets-Sheet 1

INVENTOR.
OWEN F. FOIN JR.
BY
ATTORNEY

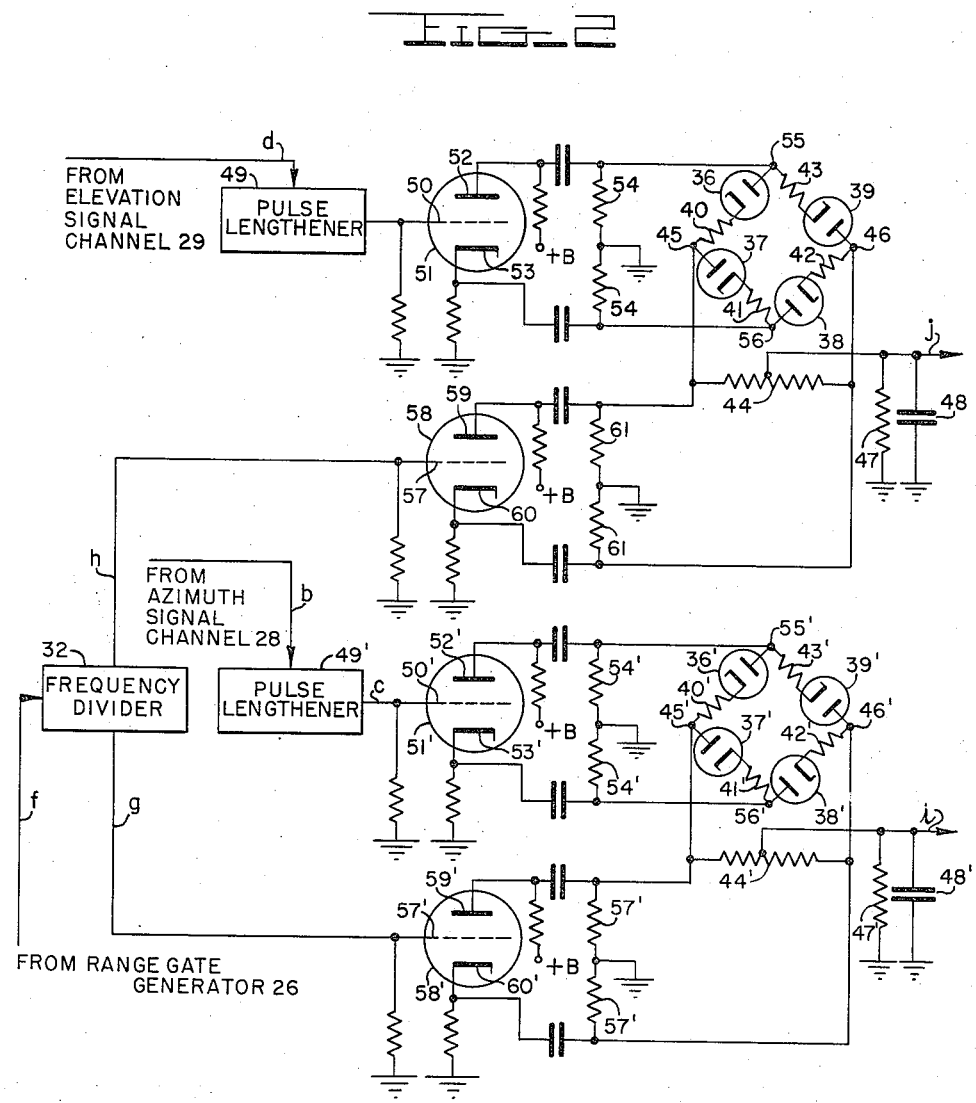

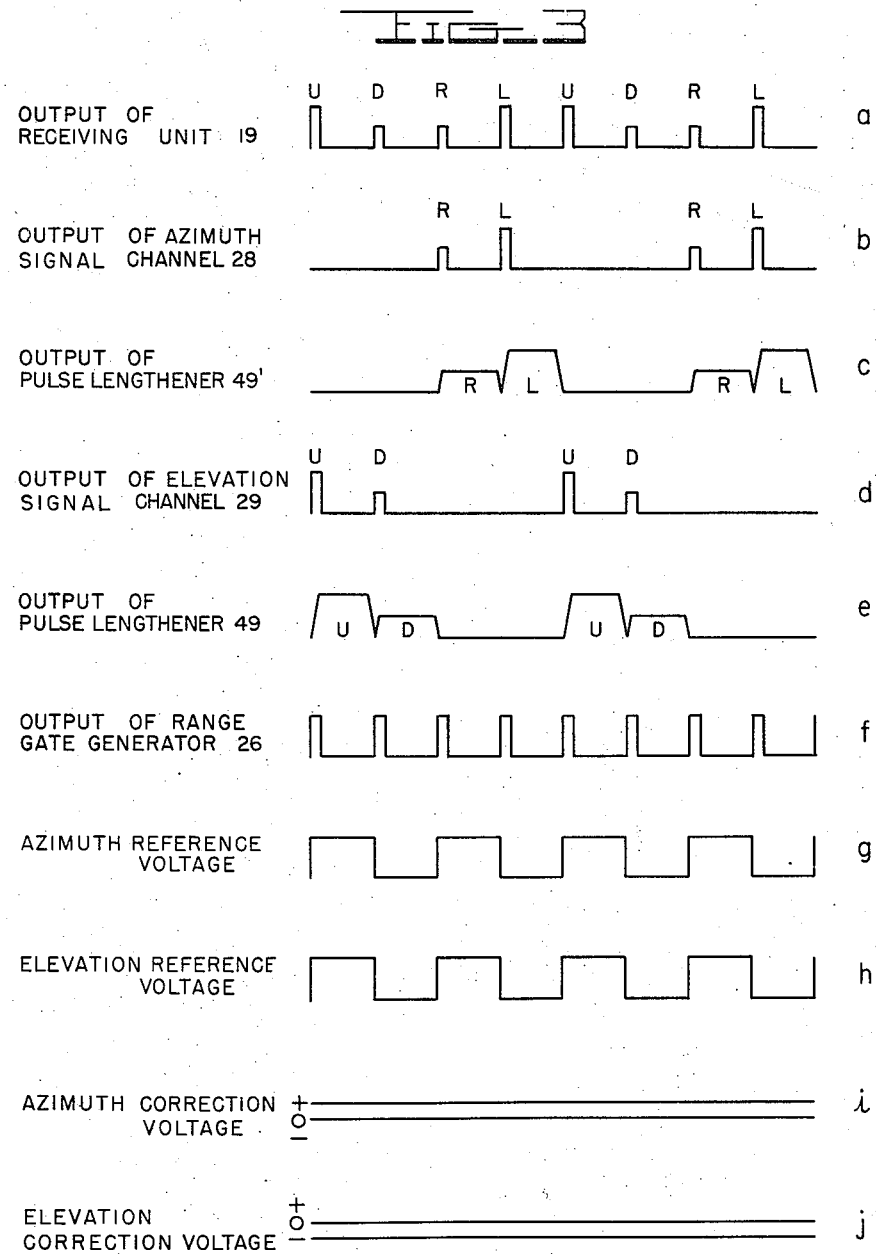

United States Patent Office 2,700,763
Patented Jan. 25, 1955

2,700,763

ANGLE DETECTOR CIRCUIT FOR RADAR USE

Owen F. Foin, Jr., Fresno, Calif.

Application August 19, 1949, Serial No. 111,291

9 Claims. (Cl. 343—11)

(Granted under Title 35, U. S. Code (1952), sec. 266)

This invention relates to angle tracking pulse-echo apparatus and more particularly to angle detector circuits for use in such apparatus.

In general, angle tracking pulse-echo apparatuses include an antenna system for periodically producing a plurality of divergent overlapping radiation patterns symmetrically positioned with respect to the normal axis of the system. This antenna system is constructed so that the radiation patterns are rotatable in unison in both a horizontal plane and in a vertical plane to track a moving object, such as an enemy airplane, and may comprise a plurality of directive transmitting or receiving antennae successively coupled to the pulse transmitter or the pulse receiver of the apparatus in synchronism with the transmitted pulses. Reflected pulse signals are amplitude modulated in accordance with the relative position of corresponding radiation patterns and the reflecting object. By establishing two pairs of divergent radiation patterns, one in the plane of azimuth and the other in the plane of elevation, and by comparing the reflected pulse signals of the radiation patterns of each pair it is possible to obtain information indicative of the position of the reflecting object with respect to the normal axis of the antenna system, and this information may be employed to sustain automatic tracking. Circuits for performing this function of comparison are known as angle detector circuits.

Prior angle detector circuits employ mechanical switching elements and coupling transformers, as well as other design characteristics which inherently render these circuits incapable of accurately detecting minute amplitude variations of short pulse signals, periodically or aperiodically occurring at a high repetition frequency. Since the accuracy of automatic tracking pulse-echo apparatuses depends upon the transmitted pulse signal repetition frequency the prior angle detector circuits directly limit the degree of accuracy that may be obtained.

It is therefore an object of the present invention to provide novel angle detector circuits for use in connection with angle tracking pulse-echo apparatus.

Another object is to provide a novel angle detector circuit responsive to fractional microsecond pulse signals periodically or aperiodically occurring at high repetition frequencies.

Still another object of the present invention is to provide angle detector circuits for use with angle tracking pulse-echo apparatus capable of periodic or aperiodic operation for producing accurate correction voltages in response to amplitude modulated pulse signals of fractional microsecond duration occurring at a frequency equal to the pulse repetition frequency of the apparatus which may be of the order of 4000 cycles per second.

Still another object is to provide a circuit for detecting amplitude modulated pulse signals, capable of rapid periodic or aperiodic operation, and characterized in such a manner as to eliminate the necessity of moving elements and coupling transformers.

Other objects and features of the invention will appear more fully hereinafter upon consideration of the following detailed description in connection with the accompanying drawings which disclose one embodiment of the invention. It is to be expressly understood, however, that the drawings are designed for purposes of illustration only and not as a definition of the limits of the invention, reference for the latter purpose being had to the appended claims.

In the drawings, wherein similar reference characters denote similar elements throughout several views:

Fig. 2 is a diagrammatic illustration, in circuit and block form, of angle detector circuits constructed in accordance with the principles of the present invention, and Fig. 3 is an illustration of waveforms developed during operation of the angle detector circuits disclosed in Fig. 2.

Figure 1:
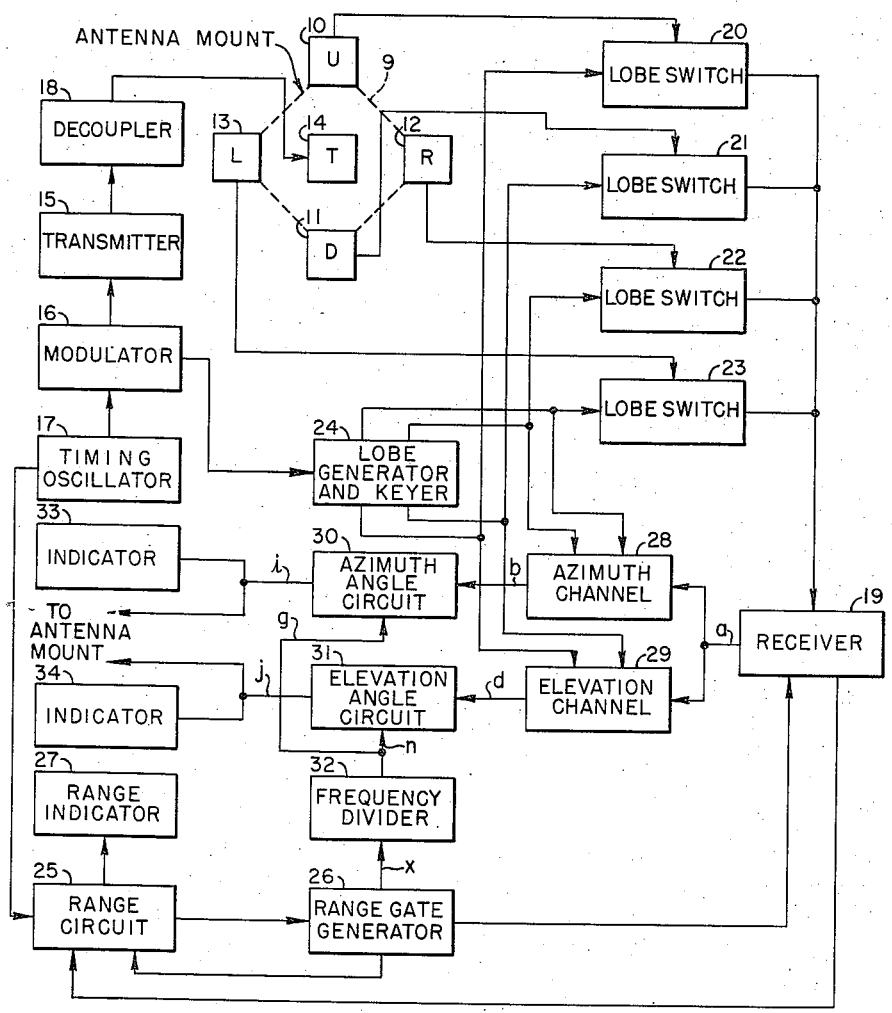
Fig. 1 is a diagrammatic illustration, in block form, of an angle tracking pulse-echo apparatus embodying the principles of the present invention.

With reference more particularly to Fig. 1 of the drawings, the present invention is disclosed therein in connection with an angle tracking pulse-echo apparatus including a plurality of directional receiving antennae 10, 11, 12 and 13 and a single directive transmitting antenna 14, rotatably mounted as a unitary antenna system in both a horizontal and vertical plane by antenna system mounting means 9 constructed in any conventional manner known to those skilled in the art. The receiving antennae 10 and 11 are mounted in the plane of elevation while the receiving antennae 12 and 13 are mounted in the plane of azimuth, and all of the receiving antennae are relatively positioned so that the radiation patterns or lobes thereof are substantially equally overlapping. The apparatus further includes a transmitting unit comprising a radio frequency transmitter 15 controlled by a pulse modulator 16 in accordance with the output of a timing oscillator 17. The series of equally spaced radio frequency pulses produced by the transmitter 15 is conventionally coupled to the transmitting antenna 14 through a decoupler 18 for preventing transmitter absorption of low level signals. The pulse-echo apparatus also includes a receiving unit comprising a radio frequency receiver 19 coupled to the receiving antennae 10, 11, 12 and 13 through lobe switch devices 20, 21, 22 and 23, respectively. A lobe generator and keyer 24, operable in accordance with the output of the pulse modulator 16, is provided for successively energizing the lobe switch devices in synchronism with transmitted pulses so that the receiving antennae are successively coupled to the receiving unit 19 during the periods between transmitted pulses. The lobe switch devices may be constructed in accordance with the principles disclosed in the co-pending application of Owen F. Foin, Jr., Serial No. 27,097, filed May 14, 1948 for Combination T—R and R—F Switch Tubes, or the lobe switch devices may comprise any conventional device capable of switching high power radio frequency energy. If devices of the latter character are employed conventional receiver protection means must be provided in the connections between the receiving antennae and the receiving unit 19. The generator and keyer 24 may take the form of any conventional circuit capable of successively energizing a plurality of output channels, such as a cascade arrangement of counter circuits controllable by the output of the pulse modulator 16.

Automatic range tracking is provided by means including a range circuit 25 and a range gate generator 26. For this purpose, the receiving unit 19 is normally blocked, by suitably biasing an output tube thereof, and is adapted to be unblocked or gated in response to application of a pulse from the range gate generator 26. The pulses or "gates" from the range gate generator 26 approximate the duration of transmitted pulses so as to only allow one reflected pulse signal to energize the receiving unit 19 during gated or unblocked intervals. The range circuit 25 operates in accordance with the output of the timing oscillator 17 and functions to maintain coincidence between pulses from the range gate generator 26 and reflected pulse signals by controlling the phase of the control signal fed to the range gate generator 26. A range indicator 27, such as an indicator of the cathode ray tube type, is associated with the range circuit 25.

Automatic azimuth and elevation tracking circuits of the pulse-echo apparatus include an azimuth signal channel 28 and an elevation signal channel 29, fed by the gated output of the receiving unit 19. The signal channels may comprise normally blocked amplifier channels, including unblocking means respectively operative in response to the signals fed to the lobe switch devices 22—23 and 20—21. The outputs of the azimuth and elevation signal channels 28 and 29 are respectively fed to azimuth angle detector circuit 30 and to elevation angle detector circuit 31. The construction and operation of the angle detector circuits 30 and 31 will appear more fully hereinafter. The azimuth and elevation angle detector circuits 30 and 31 are synchronized with the apparatus through a frequency divider 32 fed from the range gate generator 26, and the correction voltage outputs therefrom are employed to control orientation of the antenna system as well as to control other devices, such as guns, etc., in azimuth and elevation. Indicators 33 and 34, which may be of the cathode ray tube type, are connected to the outputs of the angle detector circuits and provide indications of the object being tracked with respect to the antenna system.

The azimuth and angle detector circuits are shown in greater detail in Fig. 2 of the drawings. As shown, the elevation angle detector circuit comprises a plurality of uni-directional electron discharge devices 36, 37, 38 and 39 connected in series to form a bridge network. Balancing resistors 40, 41, 42 and 43 are included in the series connection to compensate for variations in the characteristics of the discharge devices. A resistor 44 is coupled to the network, in parallel relation with the discharge devices 36—39 and 37—38, by connections to junctions 45 and 46 thereof. An output circuit, comprising an integrating circuit including resistance 47 and capacitance 48, is connected to the mid-point of the resistor 44. Received pulse signals from the elevation signal channel 29 are fed to the elevation angle detector through a pulse lengthener 49 constructed to produce, in response to each pulse applied thereto, an output pulse having an amplitude proportional to the amplitude of the input pulse and having a duration substantially equal to the period between transmitted pulses. The output of the pulse lengthener 49 is coupled to a control grid 50 of an electron discharge device 51 which also includes an anode 52 and a cathode 53 and which is normally biased immediately below cut-off. The anode 52 and the cathode 53 are balanced to ground through resistors 54—54 and are coupled to junctions 55 and 56, respectively, of the bridge network.

Reference voltages for the angle detector circuit are derived from the output of the frequency divider 32. The output of the frequency divider 32 feeds a control grid 57 of an electron discharge device 58 normally biased immediately below cut-off. The discharge device 58 includes an anode 59 and a cathode 60 balanced to ground through resistors 61—61 and respectively coupled to the junctions 45 and 46 of the bridge network.

The azimuth angle detector circuit is constructed in a manner similar to the elevation angle detector circuit described heretofore with the input thereof fed from the azimuth signal channel 28. Similar elements of the azimuth angle detector circuit are designated by corresponding primed reference numerals.

Operation of the azimuth and elevation angle detector circuits and the relationships thereof with the pulse-echo apparatus disclosed in Fig. 1 will be more fully understood with reference to the waveforms depicted in Fig. 3 of the drawings. Waveform $a$ illustrates the gated output of the receiving unit 19, wherein the pulses designated U, D, R and L correspond respectively to pulses passed by the lobe switch devices 20, 21, 22 and 23. The pulses U, D, R and L are shown having unequal amplitudes to simulate a condition wherein the reflecting object is asymmetrically positioned with respect to the radiation patterns of the antenna system. Waveforms $b$ and $d$ comprise the outputs of azimuth signal channel 28 and elevation signal channel 29, respectively, and illustrate the function of these channels in separating the azimuth and elevation signals.

As mentioned heretofore, the output of the elevation signal channel 29, waveform $d$, is applied to the pulse lengthener 49 of the elevation angle detector disclosed in Fig. 2. The pulse lengthener 49 functions to produce output pulses of the character shown by waveform $e$. It is to be expressly understood that the amplitude of the pulses of waveform $e$ are proportional to the amplitude of corresponding pulses of waveform $d$, and that the former pulses are of a duration substantially equal to the period between the pulses of waveform $d$. The signal voltages applied to the junctions 55 and 56 of the bridge network from the anode 52 and the cathode 53 of the discharge device 51 therefore corresponds to the waveform $e$, with the voltages being balanced to ground and applied in phase opposition. Waveform $f$, comprising a series of equally spaced pulses at the transmitted pulse frequency and in time phase with the pulses of waveform $a$, illustrates the output of the range gate generator 26 energizing the frequency divider 32. One output of the frequency divider 32, illustrated by waveform $h$, comprise the reference voltages for the elevation angle detector circuit. The reference voltages of waveform $h$ is applied, through operation of the electron discharge device 58, to the junctions 45 and 46 of the bridge network, balanced to ground and in phase opposition. For a purpose that will appear more fully hereinafter, the reference voltages are of a magnitude greater than the magnitude of the signal voltages applied to the detector circuits.

When the reference voltages of the waveform $h$ are applied to the bridge network so that the junctions 45 and 46 are respectively at positive and negative potential the discharge devices 37 and 38 pass current if the magnitude of the reference voltage is substantially greater than the magnitude of the signal voltages applied to the junction 56. By maintaining the reference voltages at a value sufficiently greater than the signal voltage magnitude the discharge devices 37 and 38 will pass current during one cycle of the reference voltages, and the discharge devices 36 and 39 will be rendered conducting during the next succeeding cycle at which time the phase of the reference voltages shifts 180°. Alternate conduction of the discharge devices 37—38 and 36—39 alternately transfer the signal voltages applied to the junctions 55 and 56 to the output circuit coupled to the resistor 44. Since the reference voltages are synchronized with the signal voltage input to the angle detector circuit, the voltages alternately transferred to the output circuit are proportional in amplitude to the magnitude of reflected pulse signals respectively received by way of the antennae 10 and 11. The output circuit including the resistance 47 and the capacitance 48 functions to integrate the voltages applied thereto and produce a constant direct current output, hereinafter referred to as the elevation correction voltage, proportional to the difference in magnitude between signals received by way of the antennae 10 and 11, and of a polarity indicative of the antenna passing the signal of greater strength. Waveform $j$ illustrates the elevation correction voltage produced in response to application of reflected pulse signals U and D of the waveform $d$ to the elevation angle detector circuit. The negative polarity of the waveform $j$ correction voltage indicates that the antenna system must be moved downwardly in the plane of elevation to establish a symmetrical relationship between the radiation patterns of the antennae 10 and 11 and the object, while the amplitude of the correction voltage is proportional to the asymmetrical relationship. It is to be expressly understood that a positive correction voltage results when the opposite asymmetrical relationship exists, and the correction voltage is of of zero magnitude when the relationship is symmetrical.

The azimuth angle detector circuit operates in a manner similar to the elevation angle detector circuit described heretofore. Waveforms $b$ and $g$ respectively illustrate the signal voltages applied thereto and the reference voltages therefore. The correction voltage produced therefrom is illustrated by waveform $i$, wherein the polarity thereof indicates the direction the antenna system must be moved in the plane of antennae 12 and 13 to establish symmetrical relationship between the radiation patterns of the antennae 12 and 13 and the object, and wherein the magnitude thereof is proportional to the required degree of movement.

It is to be expressly understood that the azimuth and elevation correction voltages are employed to control orientation of the antenna system through conventional remotely controlled positioning mechanisms, included in the antenna mount 9, and that the correction voltages may be employed to control orientation of other equipment, such as guns for example, as well as for operating remote indicating devices.

The angle detector circuits constructed in accordance with the principles of the present invention are capable of accurately responding to signal pulses of fractional microsecond duration having a high rate of periodic or aperiodic recurrence. The advantages obtained are more fully appreciated by considering the use thereof in connection with angle tracking echo pulse apparatus, such as an apparatus disclosed in Fig. 1 of the drawings. As previously mentioned, the receiving antennae 10, 11, 12 and 13 are successively coupled to the receiving unit 19 in synchronism with transmitted pulses. Consequently, the accuracy of the apparatus in tracking a moving object is determined by the transmitted pulse repetition frequency. Prior angle detector circuits fail to accurately respond to pulses of high repetition frequency and thus establish limitations on the maximum transmitter pulse repetition frequency. On the other hand, angle detector circuits embodying the principles of the present invention allow operation at optimum transmitter pulse repetition frequencies, up to the order of 4000 cycles per second.

There is thus provided by the present invention novel angle detector circuits capable of use in connection with angle tracking echo-pulse apparatus. The angle detector circuits do not include mechanical switching elements or coupling transformers and are capable of accurately and rapidly producing output signals indicative of certain characteristics of successively received pulse signals, such as minute relative amplitude variations. Furthermore, the angle detector circuits are capable of rapid, periodic or aperiodic operation, to produce accurate indications in response to received pulses of fractional microsecond duration occurring at high repetition frequencies, such as the pulse repetition frequency of angle tracking echo-pulse apparatus, which may be in the order of 4000 cycles per second.

Although only one embodiment of the present invention has been disclosed and described herein it is to be expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. In a detector circuit, a four terminal bridge network comprising a unidirectional electron discharge device in each arm thereof with said devices poled in the same direction around said bridge, a resistance connected to said network across one pair of diagonal terminals of said bridge, an integrating circuit coupled to the mid-point of said resistance, means applying signals to be detected across the other pair of diagonal terminals of said bridge, and means applying control voltages in phase opposition to said network across said one pair of diagonal terminals of said bridge.

2. An angle detector circuit comprising a four terminal bridge network including a plurality of unilateral discharge devices connected in a closed circuit and poled in the same direction around said bridge, means applying signals to be detected in phase opposition to said network across one pair of diagonal terminals of said bridge, an integrating circuit fed from said network in parallel relation from across the other pair of diagonal terminals of said bridge and means applying alternating voltages 180° out of phase to said network across said other pair of diagonal terminals of said bridge so that signals of one phase are applied to said integrating circuit during one excursion of said alternating voltage and signals of the other phase are applied to said integrating circuit during the other excursion of said alternating voltage.

3. A detector for recurrent alternately characterized pulse signals comprising pulse lengthening means for producing lengthened pulses having an amplitude proportional to the amplitude of said pulse signals and having a duration substantially equal to the period between said pulse signals, a four terminal bridge network including a uni-directional electron discharge device in each arm thereof with each of said devices poled in the same direction around said bridge, circuit means applying said lengthened pulses in phase opposition across one pair of diagonal terminals of said network, an integrating circuit connected to said network in balanced parallel relation with the other pair of diagonal terminals of said bridge, means applying a voltage having an amplitude greater than the amplitude of said lengthened pulses and having a duration at least equal to the duration of said lengthened pulses in phase opposition to said network across said other pair of diagonal terminals of said bridge, and means producing a 180 degree phase shift in said voltage in synchronism with recurrence of said pulse signals.

4. A detector circuit for alternately characterized recurrent pulse signals comprising means fed by said pulses for producing lengthened pulses, circuit means responsive to said lengthened pulses for producing two series of corresponding pulses in phase opposition, a four terminal bridge network including a uni-directional electron discharge device in each arm thereof with all of said devices poled in the same direction around said bridge, means applying one of said series to one terminal of said network and the other of said series to a diagonal terminal of said network, a resistor connected across said network in quadrature with respect to the connections of said one and said other series thereto, an integrating circuit coupled to the mid-point of said resistor, means for applying voltages 180 degrees out of phase across said network in parallel with said resistor, said voltages having excursions at least equal to the duration of said lengthened pulses, and means alternating said voltages in synchronism with recurrence of said pulse signals.

5. In a radio pulse apparatus, a pair of directive antennae having overlapping radiation patterns in a certain plane, a radio pulse transmitting unit and a radio pulse receiving unit, means switching said antennae successively to said receiving unit at a rate determined by the pulse repetition frequency of said pulse transmitting unit, a detector circuit fed by the output of said receiving unit for determining a measure of the relative amplitudes of pulse signals received from said antennae, said detector circuit comprising a four terminal bridge network including a plurality of uni-directional electron discharge devices connected in a closed circuit and poled in the same direction around said bridge, means applying said received pulse signals in phase opposition across one pair of diagonal terminals of said network, an integrating circuit fed from the other pair of diagonal terminals of said network in balanced parallel relation, a source of voltage alternating at the said pulse repetition frequency and means applying said alternating voltage 180 degrees out of phase to said network in parallel relation with said other pair of diagonal terminals for controlling energization of said devices.

6. In a radio pulse apparatus, a pair of directive antennae having overlapping radiation patterns in a certain plane, a radio pulse transmitting unit and a radio pulse receiving unit, means switching said antennae successively to said receiving unit at a rate determined by the pulse repetition frequency of said pulse transmitting unit, a detector circuit fed by the output of said receiving unit for determining a measure of the relative amplitudes of pulse signals received from said antennae, said detector circuit comprising a four terminal bridge network including a plurality of uni-directional electron discharge devices connected in a closed circuit and poled in the same direction around said bridge, means applying said received pulse signals in phase opposition across one pair of diagonal terminals of said network, an integrating circuit fed from the other pair of diagonal terminals of said network in balanced parallel relation, a source of voltage alternating at a frequency equal to said pulse repetition frequency and having an amplitude greater than the amplitude of said received pulse signals, and means applying said alternating voltage in push-pull relation across the said other pair of diagonal terminals of said network.

7. In a radio pulse apparatus, a pair of directive antennae having overlapping radiation patterns in a certain plane, a radio pulse transmitting unit and a radio pulse receiving unit, means switching said antennae successively to said receiving unit at a rate determined by the pulse repetition frequency of said pulse transmitting unit, a detector circuit fed by the output of said receiving unit for determining a measure of the relative amplitudes of pulse signals received from said antennae, said detector circuit comprising a four terminal bridge network including a plurality of uni-directional electron discharge devices connected in a closed circuit and poled in the same direction around said bridge, means responsive to said received pulse signals producing lengthened pulses in accordance therewith having a duration substantially equal to the period between said received pulse signals, means applying said lengthened pulses in phase opposition across one pair of diagonal terminals of said network, an integrating circuit fed from the other pair of diagonal terminals of said network in balanced parallel relation, a source of square-wave voltage alternating at a frequency equal to said pulse repetition frequency and in synchronism therewith, said square-wave voltage having an amplitude greater than the amplitude of said lengthened pulses and having excursions substantially equal to the duration of said lengthened pulses, and means applying said alternating square-wave voltage in push-pull relation to said other pair of diagonal terminals of said bridge.

8. In a radio pulse apparatus, two pairs of directive antennae each having overlapping radiation patterns in a certain plane with the radiation patterns of one pair being in quadrature with the radiation patterns of the other pair, a radio pulse transmitting unit and a radio pulse receiving unit, means switching said antennae successively to said receiving unit at a rate corresponding to the pulse repetition frequency of said transmitting unit, and means determining a measure of the relative amplitudes of pulse signals received from each pair of said antennae, the last-named means comprising a detector circuit fed by pulse signals received from one pair of said antennae and a detector circuit fed by pulse signals received from the other pair of said antennae, each of said detector circuits comprising a plurality of unidirectional electron discharge devices connected together to form a four terminal bridge network in which the electron discharge devices are all poled in the same direction around the bridge, means applying said pulse signals in phase opposition across one pair of diagonal terminals of said network, an integrating circuit fed from the other pair of diagonal terminals of said network in balanced paralled relation and means applying alternating voltages in push-pull relationship to said other pair of diagonal terminals of said network for controlling energization of said devices, said alternating voltages having an amplitude greater than the amplitude of said pulse signals and having excursions at least equal to the duration of said pulse signals.

9. A signal comparator circuit for comparing the amplitude of a pair of time spaced recurrent signal pulses comprising, a four terminal bridge network including a unidirectional current conduction device in each arm of the bridge with each of said devices poled in the same direction around the bridge, push-pull signal input means for applying said pair of recurrent signals in push-pull across one pair of diagonal terminals of said bridge, an integrating network connected to said bridge network in balanced relation across the other pair of diagonal terminals of said bridge, an alternating current reference potential having a phase and frequency such that the successive half cycles thereof coincide with the respective signal pulses of said pair of recurrent signals, and means for applying said reference potential in push-pull across said other pair of diagonal terminals of said bridge.

References Cited in the file of this patent

UNITED STATES PATENTS

| | | |
|---|---|---|
| 2,231,997 | Guanella | Feb. 18, 1941 |
| 2,399,586 | Toomin | Apr. 30, 1946 |
| 2,418,156 | Bollman | Apr. 1, 1947 |
| 2,434,273 | Ketchledge | Jan. 13, 1948 |
| 2,438,947 | Rieke | Apr. 6, 1948 |
| 2,443,195 | Pensyl | June 15, 1948 |
| 2,454,807 | Kennedy | Nov. 30, 1948 |
| 2,457,173 | Newitt | Dec. 28, 1948 |
| 2,526,509 | Shawhan | Oct. 17, 1950 |
| 2,529,876 | Jofeh | Nov. 14, 1950 |

FOREIGN PATENTS

| | | |
|---|---|---|
| 600,313 | Great Britain | Apr. 6, 1948 |
| 600,483 | Great Britain | Apr. 9, 1948 |